Figure 1:
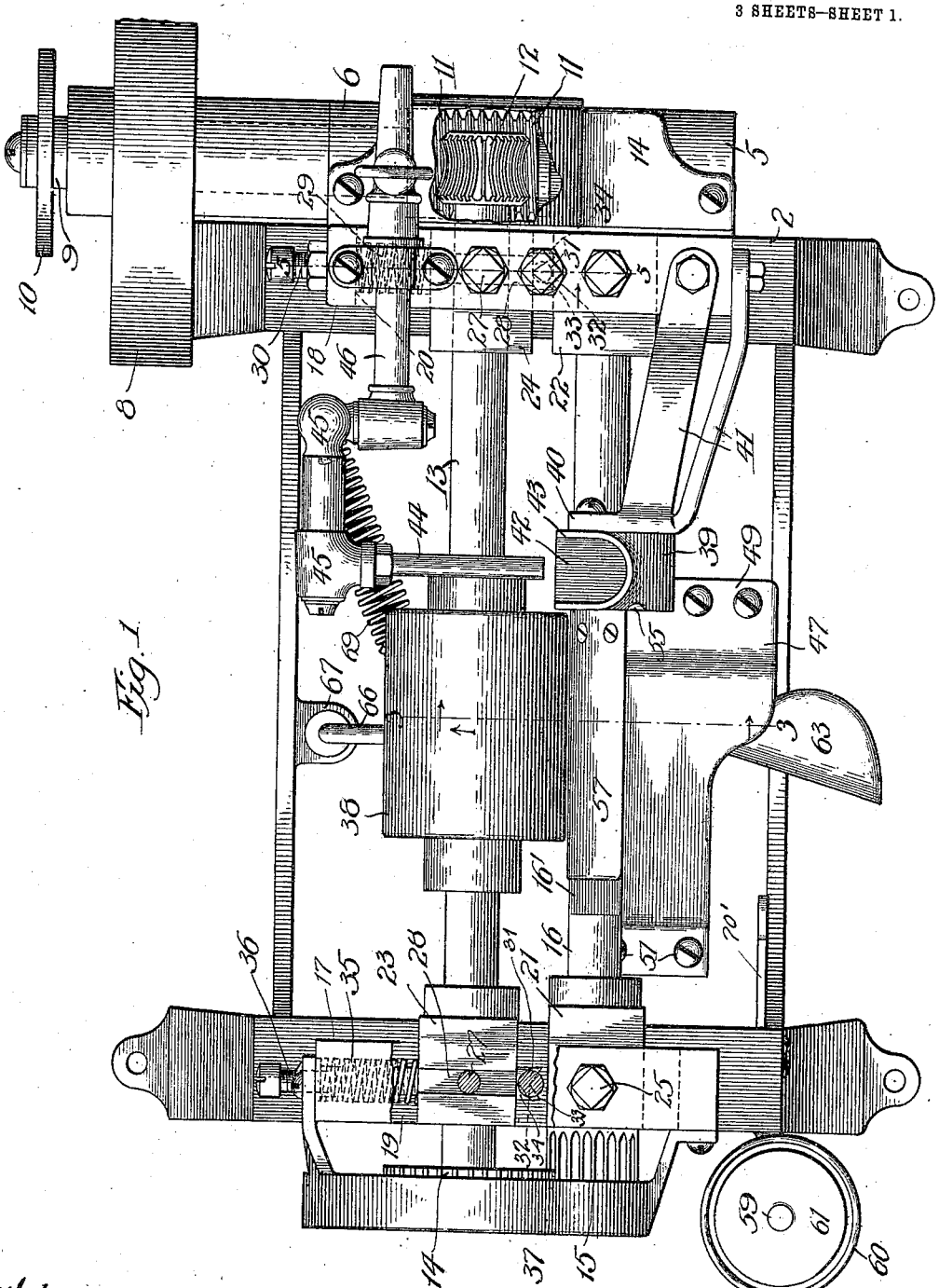

J. J. POLASKI.
COLLAR SHAPING AND EDGING MACHINE.
APPLICATION FILED JUNE 27, 1910.

987,741.

Patented Mar. 28, 1911.
3 SHEETS—SHEET 1.

Witnesses
Inventor
John J. Polaski

J. J. POLASKI.
COLLAR SHAPING AND EDGING MACHINE.
APPLICATION FILED JUNE 27, 1910.
987,741.
Patented Mar. 28, 1911.
3 SHEETS—SHEET 2.
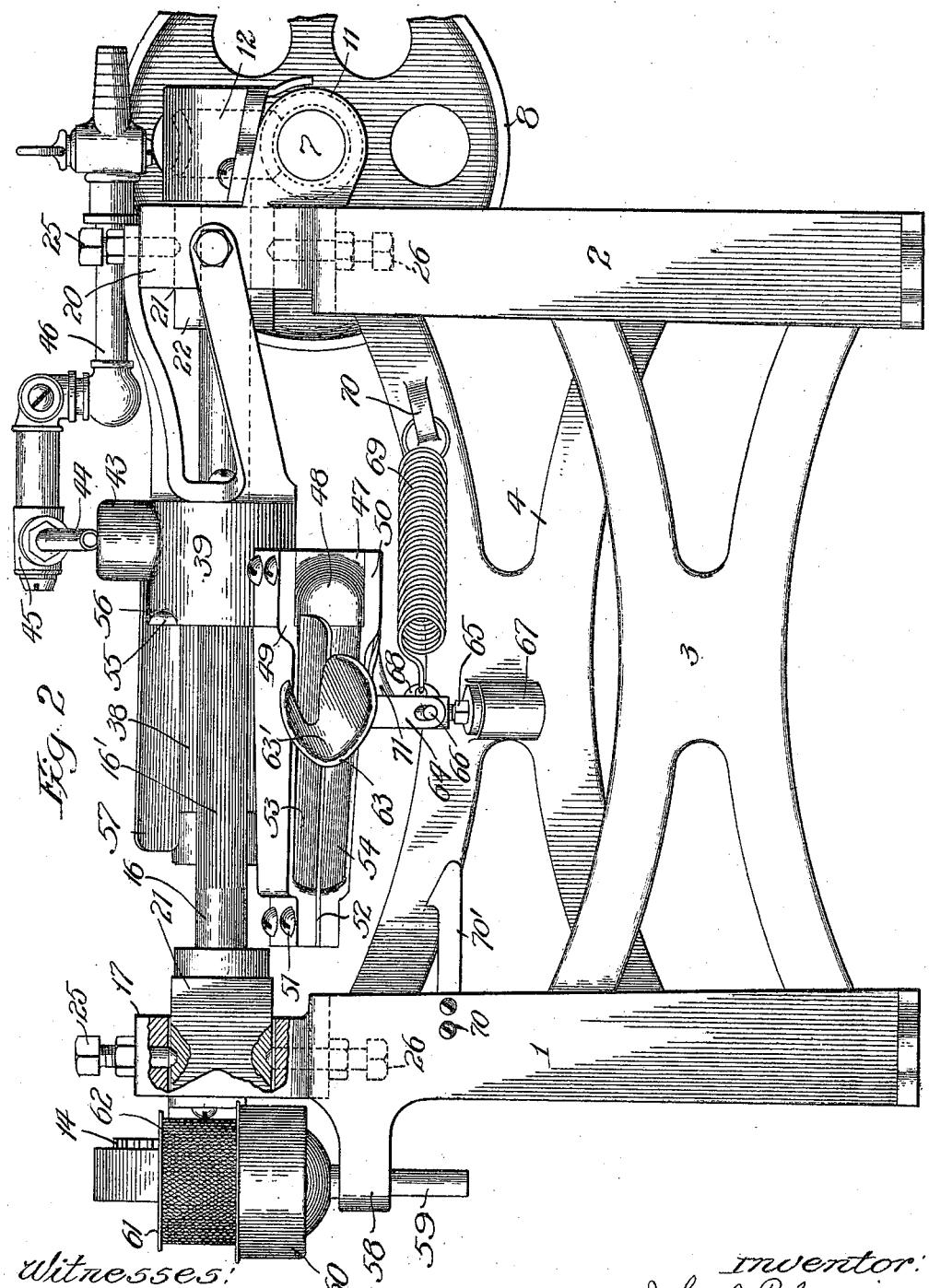

J. J. POLASKI.
COLLAR SHAPING AND EDGING MACHINE.
APPLICATION FILED JUNE 27, 1910.
987,741.
Patented Mar. 28, 1911.
3 SHEETS—SHEET 3.
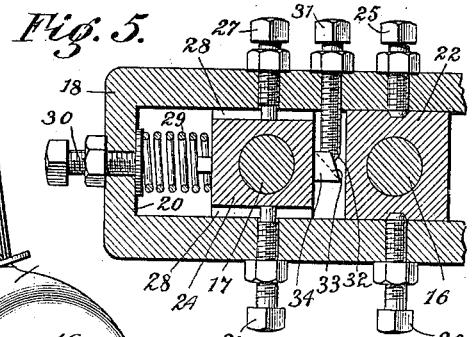
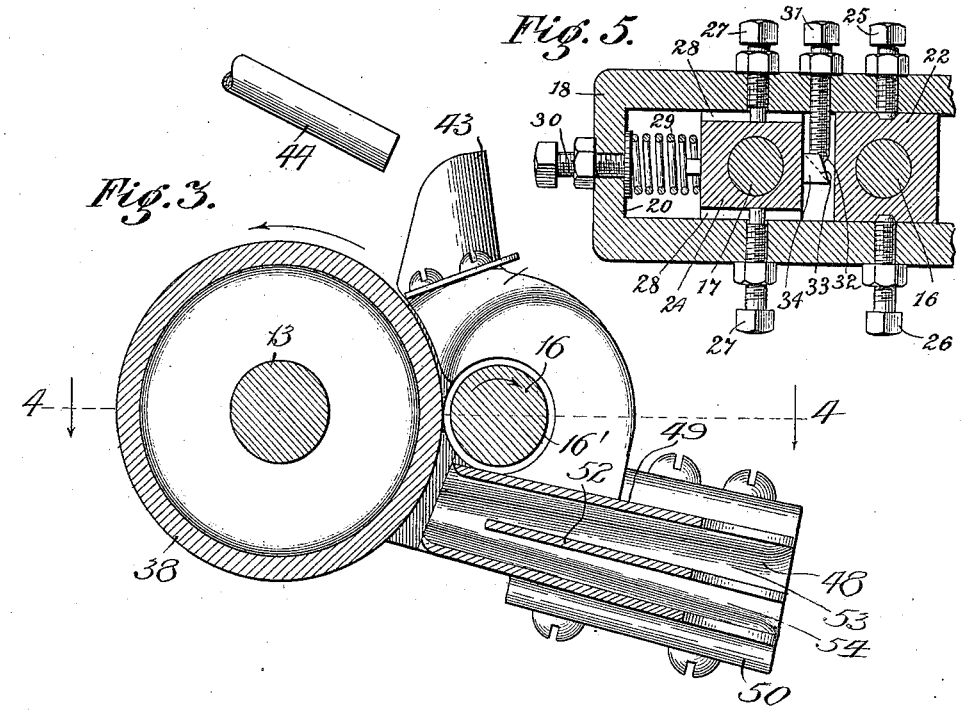
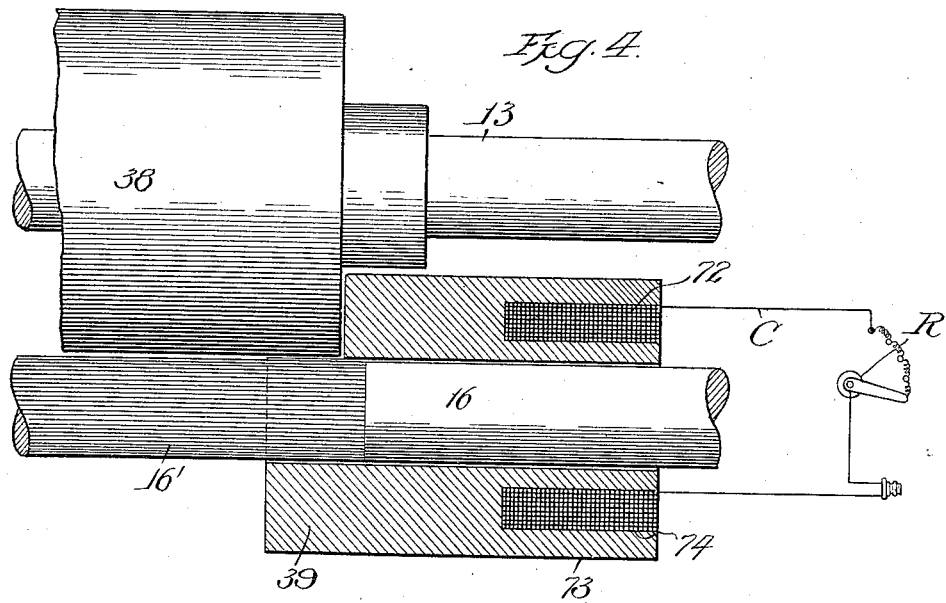
Witnesses:
Inventor
John J. Polaski
By Offield, Towle, Graves & Offield
Attys.

UNITED STATES PATENT OFFICE.

JOHN J. POLASKI, OF CHICAGO, ILLINOIS, ASSIGNOR TO CHICAGO LAUNDRY MACHINERY COMPANY, OF CHICAGO, ILLINOIS, A CORPORATION OF ILLINOIS.

COLLAR SHAPING AND EDGING MACHINE.

987,741.  Specification of Letters Patent.  Patented Mar. 28, 1911.

Application filed June 27, 1910. Serial No. 569,038.

*To all whom it may concern:*

Be it known that I, JOHN J. POLASKI, a resident of Chicago, in the county of Cook and State of Illinois, have invented certain new and useful Improvements in Collar Shaping and Edging Machines, of which the following is a full, clear, and precise specification.

My invention relates to laundry machinery, particularly to collar shaping and edging machines.

Among the important objects of my invention are to provide a machine which can be used with equal facility and efficiency for treating either turn-down or stand-up collars; to provide a machine of this class with an entrance edging surface and an exit edging surface whereby the collar edge receives a final edging treatment after its first edging treatment and its passage between the shaping rolls and guides; to provide improved construction and arrangement for the propulsion and shaping rolls and mechanism; to provide improved means for supplying heat to the edging surfaces, particularly to provide for electrically heating such surfaces; to provide improved resilient mounting for one of the shaping rolls and improved construction of the driving mechanism therefor; to construct a machine possessing the above characteristics with a minimum number of parts to reduce the size and weight of the machine and to simplify the operation thereof; and in general to provide a more useful and efficient machine of the class referred to.

The nature of my invention will be plainly understood from the following specification and the accompanying drawings, in which drawings—

Figure 1 is a plan view of the machine, Fig. 2 is a front elevation thereof, Fig. 3 is an enlarged sectional view taken on line 3—3, Fig. 1 to show particularly the edging and shaping mechanism, Fig. 4 is a view taken substantially on line 4—4, Fig. 3 to show a modified electrical heating arrangement, and Fig. 5 is a sectional view taken on plane 5—5, Fig. 1.

The machine frame comprises vertical end frames 1 and 2 connected together by side frames or braces 3 and 4. Bearing lugs 5 and 6 extend laterally from the upper end of the side frame 2 and journal a drive shaft 7 loosely pivoting at its outer end a drive pulley 8 adapted for driving connection with the shaft by suitable clutch mechanism 9 controlled by the disk 10. This drive shaft between the bearings 5 and 6 mounts a worm 11 which meshes with a worm wheel 12 carried at the end of the roll shaft 13, a housing 14 secured to the bearing lugs serving to protect the worm and worm wheel. The other end of shaft 13 carries a transmission gear 14 meshing with transmission pinion 15 at the end of shaft 16 running parallel to shaft 13. The side frames 1 and 2 have on their tops rectangular extensions 17 and 18 forming transverse rectangular pockets 19 and 20 for receiving the bearing blocks 21, 22 and 23, 24 for shafts 16 and 13 respectively. The blocks 21 and 22 are fixed in the slots by means of upper and lower pivotal set screws 25 and 26 respectively so that these blocks form pivotal bearings for the shaft 16 but to fix the shaft 16 against transverse play. The blocks 23, 24 for shaft 13 are, however, slidable in their slots, their pivotal set screws 27 extending into slots 28 in said blocks to pivotally set said blocks in the slots but to allow longitudinal movement therein to carry the shaft 13 from or toward shaft 16 as best shown in Fig. 5. At the driving end of the machine a compression spring 29 carried on set screw 30 abuts against the driving end block and tends to force it toward adjacent block 22 of shaft 16, but the approach of the shaft 13 toward the shaft 16 is limited by a set screw 31 having a tapered end 32 engaging in the crotch 33 of a lug 34 on the driving end block 24 (Fig. 5). By raising and lowering this set screw 31 the distance between shafts 13 and 16 at the driving end can be adjusted. At the transmission end a spring 35 carried on set screw 36 abuts against the block 23, but the distance between the shafts is controlled by a set screw 31 coöperating with the block in the same manner as the set screw 31 coöperates with the driving end block 24.

Between its bearing blocks the shaft 13 mounts a large roll or drum 38 which may be hollow, as shown in Fig. 3, this drum coöperating with the shaft 16 to propel collars through the machine and to shape them. The section 16′ of shaft 16 adjacent the drum is preferably slightly grooved or serrated in order to more efficiently propel the collars. Encircling shaft 16 adjacent the right end of the roll 38 is a heating iron or block 39 secured to flange 40 supported from the machine frame 2 by arms 41, this heating or ironing block, as shown in Figs. 1, 2 and 3, having a flame pocket 42 formed by the upwardly extending wall 43, a burner end 44 being pivotally connected at 45 to a gas supply pipe 46 mounted on the frame 2 to be adjustable to deflect the heating flame into the pocket 42. From the inner end of the heating iron or block 39 a guiding and edging block 47 extends forwardly and slightly downwardly and has the U-shaped guiding and edging groove 48 which flares considerably at its front end and tapers gradually toward its rear end, as best shown in Figs. 2 and 3. Secured to and extending toward the left from the extension 47 are the upper and lower guide plates 49 and 50 whose left ends are secured together by screws 51 and clamp between them an intermediate guide plate or tongue 52 which extends toward the right to within a short distance of the edging groove 48, the end of the tongue being well rounded. The tongue with the upper and lower plates 49 and 50 forms the upper and lower compartments or passageways 53 and 54 through which a turn-down collar is guided into position between the roll 38 and shaft section 16'. At the upper part of the inner end of the heating block 39 is cut a groove 55 which forms the exit edging surface 56, and secured to the heating iron over this groove and extending toward the left therefrom is the guide wing or plate 57 for receiving the collar after passage between roll 38 and shaft section 16' to guide the collar forwardly out of the machine and to guide its edge against the finishing surface 56.

At the top of the side frame 1 a lug 58 detachably supports a post 59 whose upper end is surrounded by a water cup 60 for supporting a spool 61 carrying a wick 62.

The operation of the machine can now readily be understood. The clutch is drawn in and the machine started, rotation of the drive wheel being communicated to the shafts 13 and 16 to cause rotation thereof in the direction of the arrows indicated. A turn-down collar which has been previously ironed in its open flat condition is first run through a seam dampener (which forms no part of this invention) and one end of the collar turned over. The collar is then fed into the machine by inserting the inner and outer bands thereof into compartments 53 and 54 until the inserted end of the collar is taken hold of by the roll 38 and shaft section 16', the end of tongue 52 guiding and holding the seam or edge of the collar against the edging surface 48. When the collar end reaches the guide wing 57 it is deflected outwardly with its edge or band into groove 55 and against the finishing and edging surface 56, the iron block and its edging extension 48 having, of course, been brought to a sufficient heat before the collar was inserted, this heat being more or less distributed over the parts to thoroughly dry the collar and to put the proper ironing finish along the band or upper edge thereof. The collar is eventually delivered from the machine, and if it is desired to again subject it to an edging treatment the edge thereof can be run across the wick 62 to be moistened and the collar then re-inserted into and passed through the machine.

The machine can be used with equal facility for finishing an edge of a stand-up collar, and in order to guide and hold the collar edge against the edging surfaces I provide an attachment for the machine. This attachment comprises a substantially V-shaped guide frame 63 having a supporting stud 64 adjustably supported by set screw 65 along the front end of a rod 66 whose rear end pivots in a lug 67 on the cross frame 4 of the machine to adapt the rod for lateral swing to carry the guiding member 63 toward and away from the edging extension 48, the guide surface 63' for the member 63 being in line with the upper feed compartment 53. The rod 66 carries near its pivoted end an eye extension 68 for detachably receiving one end of a contractile spring 69 which is anchored to the cross frame 4 at 70. When the machine is used for turn-down collars the rod 66 is swung to the left into locking engagement with the latch bar 70' extending from side frame 1 (Fig. 2). However, when stand-up collars are to be treated the spring is connected with the arm so that the guide member is drawn toward the edging block 48. A stand-up collar, after first having its upper edge moistened by passage over the wick 62, is inserted into compartment 53 and between the guide member 63 and edging block 48 until it is taken hold of by the rolls whereupon the collar will be drawn through the rolls and deflected outwardly by the guide wing 57, the guide member 63 and the guide wing 57 serving to hold the collar edge against the inlet and exit edging surfaces. The inward movement of the guiding member 63 can be limited by a stop plate 71 secured to and extending from the edging block 48 to abut against the arm 66. Thus the machine can be used with equal facility for both turn-down and stand-up collars. The ironing block, with its attachments, and the roll members and collar guide members are made from material which is highly conductive to heat so that the heat from the burner will be conducted to the various parts and particularly to the edging surfaces to thoroughly shape, edge and finish the collars.

Collars are of varying thickness, and therefore the bearing blocks for the shaft 13 are yieldably and slidably mounted, as has been described. On passage of a collar through the machine the springs 29 and 35 yield, and thus the collar will not be injured by passage between the rolls, the pressure of the roll 38 against shaft section 16' being sufficient only to insure proper propulsion of the collar through the machine.

Instead of using a flame for heating the apparatus electricity can be used as a heat source. As shown in Fig. 4, the heating head or iron 39 could be heated by means of a heat coil 72 which may be applied in any suitable manner. As shown, the head 39 has an extension 73 encircling shaft 16 having the annular pocket 74 for receiving the heat coil or winding 72. A circuit $c$ will serve to connect the winding with any suitable source of current, and if desired, a resistance adjusting device R can be included in the circuit for adjusting the current flow to give desired degrees of heat.

Other changes and modifications may also be made which would still come within the scope of my invention, and I do not, therefore, desire to be limited to the exact forms, construction and operation shown, but I desire to secure the following claims by Letters Patent:

1. In a machine of the class described, the combination of an ironing block having an edging surface, walls forming guide compartments for collars, one of said walls serving to deflect and to press the edge of a collar against said edging surface, propulsion mechanism for receiving the collar after passage through the compartments and for drawing the collar through said compartments, a guide member supported from said ironing block for receiving the collar after it emerges from the propulsion mechanism and for guiding the collar outwardly from the machine, said ironing block having a second edging surface adjacent said guiding member against which surface the collar is deflected and held by said guiding member, and means for heating the ironing block.

2. In a machine of the class described, the combination of an ironing block having an edging surface, plates secured at one end to said ironing block respectively above and below said edging surface and extending therefrom, a tongue held between the other ends of said plates and extending inwardly toward said edging surface and forming upper and lower compartments with said plates for receiving and guiding the inner and outer bands of a turn-down collar, said tongue serving to deflect and to press against said surface the collar edge to be finished, propulsion mechanism for drawing the collar through said compartments, and means for heating said ironing block.

3. In a machine of the class described, the combination of an ironing block having an edging surface, plates secured at one end to said ironing block respectively above and below said edging surface and extending therefrom, a tongue held between the other ends of said plates and extending inwardly toward said edging surface and forming upper and lower compartments with said plates for receiving and guiding the inner and outer bands of turn-down collars, said tongue serving to deflect and to press against said surface the collar edge to be finished, propulsion mechanism for drawing the collar through said compartments, a guide member for engaging the collar after it has emerged from the propulsion mechanism to guide the collar from the machine, said ironing block having a second edging surface against which the collar is held at its edge by said guide member to receive a final edging treatment, and means for heating said ironing block.

4. In a machine of the class described, the combination of an ironing block having an edging surface, plates secured at one end to said ironing block respectively above and below said edging surface and extending therefrom, a tongue held between the other ends of said plates and extending inwardly toward said edging surface and forming upper and lower compartments with said plates for receiving and guiding the inner and outer bands of a turn-down collar, said tongue serving to deflect and to press against said surface the collar edge to be finished, propulsion mechanism for drawing the collar through said compartments, a guiding wing extending from said ironing block to deflect the collar outwardly from the machine after it emerges from the propulsion mechanism, said ironing block having a second edging surface against which the edge of the collar is deflected by said guide wing to be given a final edging treatment, and means for heating the ironing block.

5. In a machine of the class described, the combination of an ironing block having an edging surface, supporting walls adjacent said edging surface for supporting and for guiding a collar into the machine, a guiding member, means for yieldingly holding the guiding member against the collar to cause the collar edge to be finished to be held against said edging surface, propulsion mechanism for receiving and for drawing the collar into the machine, a guide member for deflecting the collar from the machine after it leaves the propulsion mechanism, said ironing block having a second edging surface against which the collar edge is deflected by said guide member to be given a final edging treatment, and means for heating said ironing block.

6. In a machine of the class described, the combination of an ironing block having an edging surface, a guide frame extending from said block and forming upper and lower guide compartments for the inner and outer bands of a turn-down collar, part of said frame serving to deflect and to press against the edging surface the edge of the collar to be finished, propulsion mechanism for receiving the collar from the ends of said compartments and for drawing the collar through the machine, means for heating said ironing block, and a guide attachment for the machine comprising a guide member adapted to swing in front of one of said compartments and means for yieldingly holding said guide member against a stand-up collar inserted in said compartment to press against the edging surface the edge of the stand-up collar to be finished.

7. In a machine of the class described, the combination of a supporting frame, parallel rotatable roll members for propelling collars through the machine, bearing members for one of said roll members yieldingly mounted on said frame to allow separation of the roll members to accommodate collars of different thicknesses, an ironing block surrounding one of said roll members and having an edging surface in advance of said roll members, guide mechanism for guiding a collar toward said roll members and for holding against the edging surface the collar edge to be finished, means for deflecting the collar from the machine after emerging from the roll members, and means for heating the ironing block.

8. In a machine of the class described, the combination of a supporting frame, parallel rotatable roll members for propelling collars through the machine, bearing members for one of said roll members yieldingly mounted on said frame to allow separation of the roll members to accommodate collars of different thicknesses, an ironing block surrounding one of said roll members and having an edging surface in advance of said roll members, guide mechanism for guiding a collar toward said roll members and for holding against the edging surface the collar edge to be finished, a guide member adjacent said ironing block for deflecting the collar from the machine after it leaves the roll members, said ironing block having a second edging surface against which the collar edge is held by said guide member to be given a final edging treatment, and means for heating the ironing block.

9. In a machine for finishing both turn-over and stand-up collars, the combination of an ironing block having an edging surface, means for heating said block, guide walls extending from said block at opposite sides of said edging surface for receiving and guiding the wings of a turn-over collar, a tongue between said walls and extending toward said surface for engaging between the collar wings and to guide the bent edge of said collar against said surface, propulsion mechanism for propelling the collar between said walls, a guide member adapted to be brought into position for engaging the outer edge of a stand-up collar when said collar is inserted between one of said walls and said tongue, and means for yieldingly holding said guide member against said outer edge whereby the inner edge of said stand-up collar is yieldingly held against said finishing surface to be finished thereby.

10. In a machine of the class described, the combination of a supporting frame, an ironing block stationarily supported from said frame, means for heating said block, propelling and ironing rolls to the rear of said block, said block surrounding one of said rolls and being intimately adjacent the other roll to directly heat said rolls, guide walls extending from said block in advance of said rolls, said block adjacent said guide walls having an edging surface for receiving and finishing the edge of a collar inserted between said guide walls, said rolls receiving said collar after passage between said guide walls to propel the collar with its edge adjacent said surface, and a guide member for receiving the collar after it leaves the rolls and for directing the edge of the collar toward said block, said block having another edging surface for giving the collar edge a final edging treatment as the collar leaves the rolls.

11. In a machine of the class described, the combination of a supporting frame, a main roll pivotally mounted on said frame to rotate about a horizontal axis, a propulsion roll pivoted in front of the main roll to rotate about a horizontal axis, an ironing block stationarily supported from the frame, said block surrounding said propulsion roll and being intimately adjacent the main roll to directly impart heat to said rolls, means for heating said block, guide walls extending from said heating block in advance of said rolls for guiding a collar into position between said rolls, said block having an edging surface adjacent said guide walls, and means for guiding the collar with reference to said edging surface to press against said edging surface the collar edge to be finished.

12. In a machine of the class described, the combination of a supporting frame, a main roll pivotally mounted on said frame to rotate about a horizontal axis, a propulsion roll pivoted in front of the main roll to rotate about a horizontal axis, an ironing block stationarily supported from the frame, said block surrounding said propulsion roll and being intimately adjacent the main roll to directly impart heat to said rolls, means for heating said block, guide walls extending from said heating block in advance of said rolls for guiding a collar into position between said rolls, said block having an edging surface adjacent said guide walls, and means for guiding the collar with reference to said edging surface to press against said edging surface the collar edge to be finished, the pivot arrangement for said main roll being yielding, whereby the gap between said rolls may accommodate itself to varying thicknesses of collar.

In witness whereof, I have hereunto set my name this 23rd day of June, A. D., 1910.

JOHN J. POLASKI.

Witnesses:
CHARLES J. SCHMIDT,
NELLIE B. DEARBORN.

Copies of this patent may be obtained for five cents each, by addressing the "Commissioner of Patents, Washington, D. C."